Patented May 23, 1950

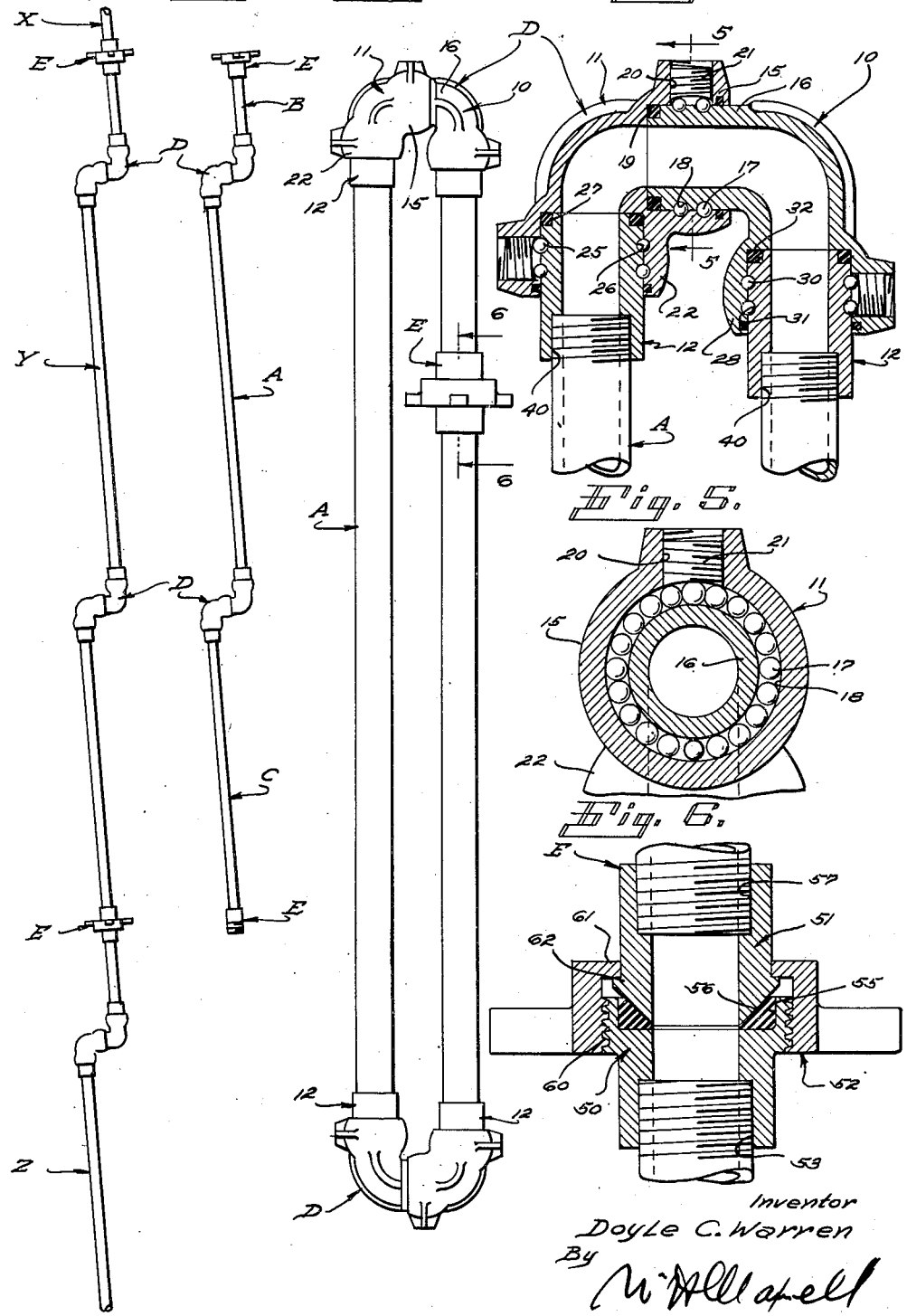

2,509,119

UNITED STATES PATENT OFFICE 2,509,119

FLUID CONDUCTOR

Doyle C. Warren, Monrovia, Calif., assignor to Chiksan Company, Brea, Calif., a corporation of California Application July 26, 1948, Serial No. 40,733

7 Claims. (Cl. 138—25)

1

This invention relates to a fluid conductor and it is a general object of the invention to provide a simple, practical, improved fluid conductor of the type involving rigid lengths of tubing or pipe joined by swivel connections.

There are various situations where flexible fluid conductors are required and where such conductors are made up of lengths or sections of pipe joined by swivel connections. This type of fluid conductor is particularly practical and suitable for heavy duty and handling fluids that are destructive of ordinary hose, or like structures.

In practice fluid conductors made up of pipe sections are somewhat difficult to handle, particularly if they are of substantial length and require transportation from one locality or situation to another. For example, in the case of oil well cementing the material introduced into the wells is advantageously handled by a conductor made up of pipe sections and swivel joints; and such structure must be such as to be readily transportable from one well to the next, and must be such that it can be handled quickly and conveniently.

It is a general object of the invention to provide a fluid conductor involving a plurality of units normally joined end to end but which are readily separable and when separated or detached each is such that it may have its ends joined together forming a compact structure that is very simple to handle.

Another object of the invention is to provide a structure of the general character referred to in which the units into which the conductors may be separated are alike and such that they can be stacked or piled adjacent each other in a limited space.

A further object of the invention is to provide a structure of the general character referred to wherein the units into which the conductor is separable are joined by releasable couplings, the operating parts of which are of such form and construction as to enable them to be repeatedly joined and released without appreciable wear or deterioration. With the construction provided by the present invention the threaded connections and the anti-friction bearings included in the structure at parts other than the coupling means may remain inact at all times.

The various objects and features of my invention will be fully understood from the following detailed description of a typical preferred form and application of the invention, throughout which description reference is made to the accompanying drawings, in which:

Fig. 1 is a view illustrating a plurality of units

2 provided by the present invention joined end to end to form an elongate flexible fluid conductor. Fig. 2 is a view showing one of the units alone or part and in opened out or extended form. Fig. 3 is an enlarged view showing one of the units embodying the present invention in folded form with its ends connected, in which condition it is suitable for handling or storing. Fig 4 is an enlarged detailed sectional view of a swivel connection embodied in the unit shown in Fig. 3, showing the connection joining two of the pipe sections of the unit. Fig. 5 is an enlarged detailed transverse sectional view taken substantially as indicated by line 5—5 on Fig. 4, and Fig. 6 is an enlarged detailed sectional view taken as indicated by line 6—6 on Fig. 3.

The structure provided by the present invention involves a plurality of elongate tubular units, one of which is shown at X in Fig. 1, another at Y and another at Z, which units are normally joined end to end to form one continuous flexible fluid conductor. The several units entering into the structure whether they be few or many, may in practice be alike or individual units may vary somewhat in length as circumstances require. For the purpose of the present disclosure the several units of the structure may be considered as alike and it is to be understood that the following detailed description of a single unit applies equally to all of the units.

The unit of the conductor as provided by the present invention and as shown in Fig. 2 of the drawings, includes, generally, a main or middle pipe section A, two outer or end pipe sections B and C, swivel connections D at the ends of the middle section A, joining the sections B and C thereto, and coupling means E at the ends of the assembly formed by the sections A, B, C and the swivel connections D.

The main or middle pipe section A is preferably of substantial length and in the form of the invention illustrated it is a straight tubular part or length of pipe of the desired length. The end sections B and C have a combined length equal to that of section A and in practice this length may be divided in any suitable manner between the sections B and C. In the particular case disclosed the section B is a short section or is shorter than section C, as will be apparent from a consideration of Figs. 2 and 3 of the drawings. In practice it is preferred that the sections B and C be simple straight tubular parts or lengths of pipe of the desired lengths and it is preferred that they be of the same size or capacity of the pipe forming section A.

There is a swivel connection D at each end of section A. One swivel connection D joins end section B to section A while the other joins end section C to section A. The swivel connections D are preferably alike and in the preferred form of the invention each involves generally cooperating male and female L-shaped members 10 and 11, respectively, and pipe members 12 joined to the pipe sections and cooperating with the L-shaped members.

The particular swivel connection D illustrated in the drawings is intended to allow substantial freedom of movement between the connected pipe sections and the several principal parts of the connection above referred to are joined by anti-friction means so that the connection works freely.

The female section 11 of the connection has a socket portion 15 at its outer end receiving the outer end portion 16 of the male section 10. Rows of balls 17 in registering grooves 18 in the parts 15 and 16 hold the part 16 in the socket 15 so that it is freely rotatable therein. Further, a suitable packing 19 is carried in the socket 15 and engages the part 16 providing a fluid tight connection between the male and female members. In the case illustrated the coupling balls 17 are introduced into place through an access opening 20 normally closed by a plug 21.

The other or inner end of the female section 11 is provided with a socket portion 22 which is at right angles to the socket portion 15 and receives a pipe member 12 on the end of one of the pipe sections. Rows of balls 25 carried in registering grooves 26 in the members 12 and 22 rotatably couple these parts while packing 27 seals between them. The balls 25 may be introduced into place through a structure similar to that above described. A socket portion 28 is provided at the inner end of the male member 10 at right angles to the portion 16 thereof. The socket portion 28 receives a pipe member 12 and balls 30 in registering grooves 31 couple these parts while a packing 32 seals between them. The balls 30 may be arranged in place through a structure similar to that described with reference to the balls 17.

The pipe members 12 are in the case illustrated simple tubular nipple-like parts with projecting ends received in the sockets where they are held, as above described. The other ends of the members 12 are internally threaded at 40 to receive the ends of the pipe sections that are joined by the connection D. The structure is preferably such that the pipe members 12 are made tight or are permanently secured on the ends of the pipe sections and the connection D is assembled with its parts connected to form a permanent swivel connection.

The coupling means E provided by the present invention is joined to or carried by the ends of the unit above described and in accordance with the present invention it is a union type of coupling. The particular form of coupling means shown in the drawings involves a female part 50 on one end of the unit, a male part 51 on the other end of the unit, and a coupling collar 52 acting to join the parts 50 and 51. As shown in the drawings the female part 50 is provided at one end with an internal thread 53 to receive one of the pipe sections, say for instance, the pipe section B, and is provided at its other end with a socket 55 carrying packing 56. The male part 51 is provided at one end with an internal thread 57 receiving one end of pipe section C while its other end enters the socket 55 and engages the packing 56. It is to be understood that the parts 50 and 51 of the union or coupling need not necessarily be formed as male and female parts so long as they engage or couple in a manner to establish the desired connection or connections as will be hereinafter described.

The coupling collar 52 is shown engaged on the exterior of the female section 50 through a coarse thread 60 and it has an inwardly projecting lip 61 engaged over or holding a flange 62 projecting from the male part 51.

When the unit of construction provided by the present invention is arranged as shown in Fig. 3 the end pipe sections B and C may be joined or connected together by the coupling means in the manner clearly illustrated in the drawings. When the unit is extended and coupled with other units to form the desired fluid conductor the coupling collar 52 of the means E receives and cooperates with the male part 51 on an adjoining unit while the male part is received by and cooperates with the coupling collar of another adjoining unit. In Fig. 1 of the drawings a unit of the present invention is shown joined with other units in the manner just described.

From the foregoing description it will be apparent that when several units embodying the present invention are joined end to end to form a fluid conductor as shown in Fig. 1 the conductor is free to move or flex in various directions. Further, it will be apparent that the desired fluid conductor may be readily established by merely joining the parts of the coupling means of the various units in the manner above described. When it is desired to store or transport the structure the units may be separated or broken apart by releasing the coupling collars 52 joining the several units and when the pipe sections of each unit are arranged as shown in Fig. 3 they may be coupled to remain in this compact, convenient form by connecting the two ends of the unit together by the coupling collar of the unit. When established in the form shown in Fig. 3 the units of the structure are simple, compact, elongate elements that can be conveniently handled, stored, transported or otherwise manipulated as circumstances may require.

Having described only a typical preferred form and application of my invention I do not wish to be limited or restricted to the specific details herein set forth, but wish to reserve to myself any variations or modifications that may appear to those skilled in the art and fall within the scope of the following claims.

Having described my invention, I claim:

1. A fluid conducting unit including, a middle pipe section, end pipe sections, swivel connections at the ends of the middle section joining the inned ends of the end sections thereto for arrangement of the end sections with their outer ends together, and coupling means carried by the outer ends of the end sections and adapted to be selectively connected to spaced conduits and engageable with each other to connect the end sections together, the combined lengths of the end sections corresponding with that of the middle section.

2. A fluid conducting unit including, a middle pipe section, end pipe sections of different lengths, swivel connections at the ends of the middle section joining the inner ends of the end sections thereto for arrangement of the end sections with their outer ends together, and coupling means carried by the outer ends of the end sections and adapted to be selectively connected to spaced conduits and engageable with each other to connect the end sections together, the combined lengths of the end sections corresponding with that of the middle section.

3. A fluid conducting unit including, a straight middle pipe section, straight end pipe sections, swivel connections joining the inner ends of the end pipe sections to the ends of the middle section for arrangement of the end sections with their outer ends together, and coupling parts at the outer ends of the end sections adapted to be selectively connected to spaced conduits and engageable with each other to connect the outer ends of the end sections together in line with each other and parallel with the middle section.

4. A fluid conducting unit including, a middle pipe section, end pipe sections, swivel connections at the ends of the middle section joining the inner ends of the end sections thereto for arrangement of the end sections with their outer ends together, and coupling means carried by the outer ends of the end sections and adapted to be selectively connected to spaced conduits and engageable with each other to connect the end sections together, the combined lengths of the end sections corresponding with that of the middle section, each swivel connection including two rotatably connected L-shaped members and parts fixed on the ends of the connected pipe sections and rotatably coupled to the said members whereby the end sections may be arranged in line with each other to be parallel with the middle section.

5. A fluid conducting unit including, a straight middle pipe section, straight end pipe sections, swivel connections at the ends of the middle section joining the inner ends of the end sections thereto for arrangement of the end sections with their outer ends together, and a coupling means carried by the outer ends of the end sections and adapted to be selectively connected to spaced conduits and engageable with each other to connect the end sections together, the end sections being of different lengths and the combined lengths of the end sections corresponding with that of the middle section, each swivel connection including two L-shaped members, anti-friction means coupling said members together for relative rotation, parts on the ends of the connected pipe sections, anti-friction means coupling one of said parts to one of said members for rotation relative thereto, and anti-friction means coupling the other of said parts to the other of said members for rotation relative thereto.

6. A fluid conducting unit including, a middle pipe section, end pipe sections, swivel connections at the ends of the middle section joining the inner ends of the end sections thereto for arrangement of the end sections with their outer ends together, and coupling means carried by the outer ends of the end sections and adapted to be selectively connected to spaced conduits and engageable with each other to connect the end sections together, the combined lengths of the end sections corresponding with that of the middle section, the coupling means including a coupling part on the outer end of each end section, one of said parts being threaded, and a threaded collar rotatably carried by the other of said parts and engageable with the threaded part to connect said parts together.

7. A fluid conductor including a plurality of like units joined end to end and each including, a middle pipe section, end pipe sections, swivel connections at the ends of the middle section joining the end sections thereto, and coupling means carried by the end sections, the combined lengths of the end sections corresponding with that of the middle section, each swivel connection including engaged L-shaped members, anti-friction means coupling said members together for relative rotation, parts on the ends of the connected pipe sections and engaged with said members, and anti-friction means coupling the said parts and members for relative rotation, the coupling means including a coupling part on each end section and a collar on one of said parts and connecting said parts.

DOYLE C. WARREN.

REFERENCES CITED

The following references are of record in the file of this patent:

UNITED STATES PATENTS

| Number | Name | Date |
| --- | --- | --- |
| 2,451,269 | Allen | Oct. 12, 1948 |